(No Model.) 2 Sheets—Sheet 2.
G. A. SHARP & R. H. HOOLE.
ADVERTISING WAGON.
No. 574,766. Patented Jan. 5, 1897.
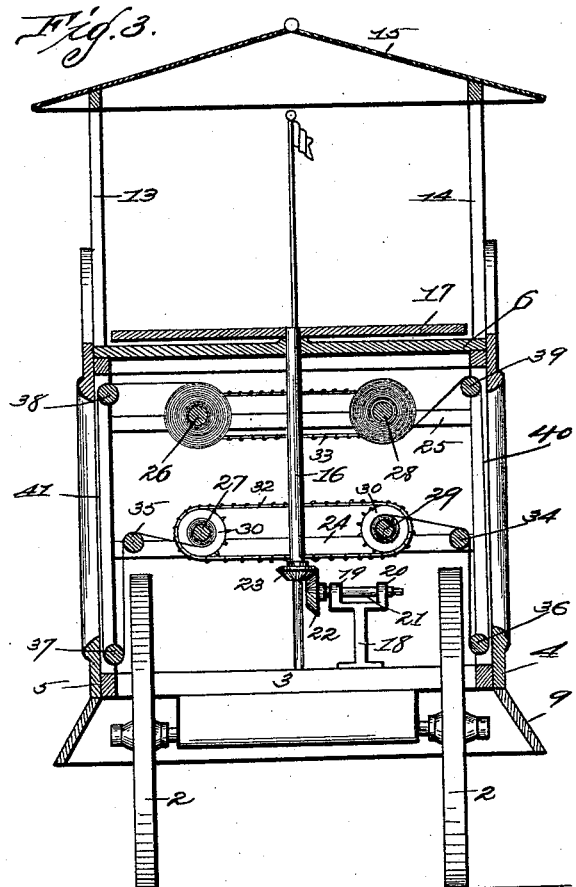
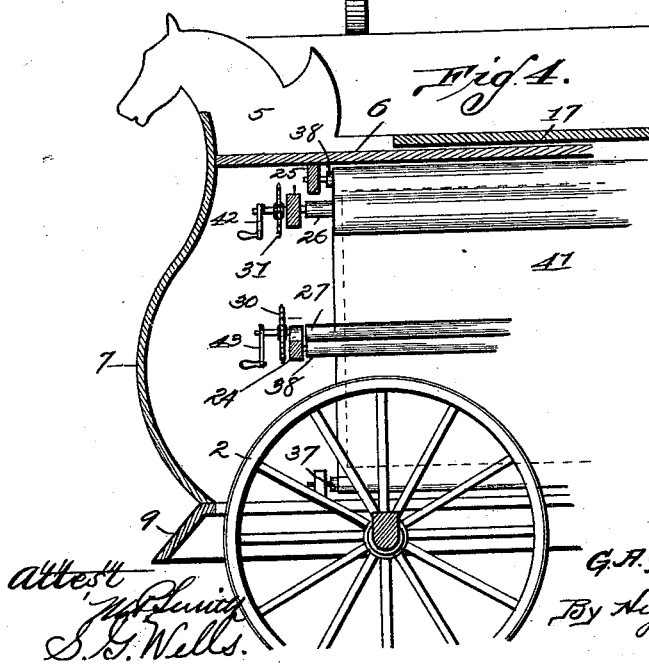

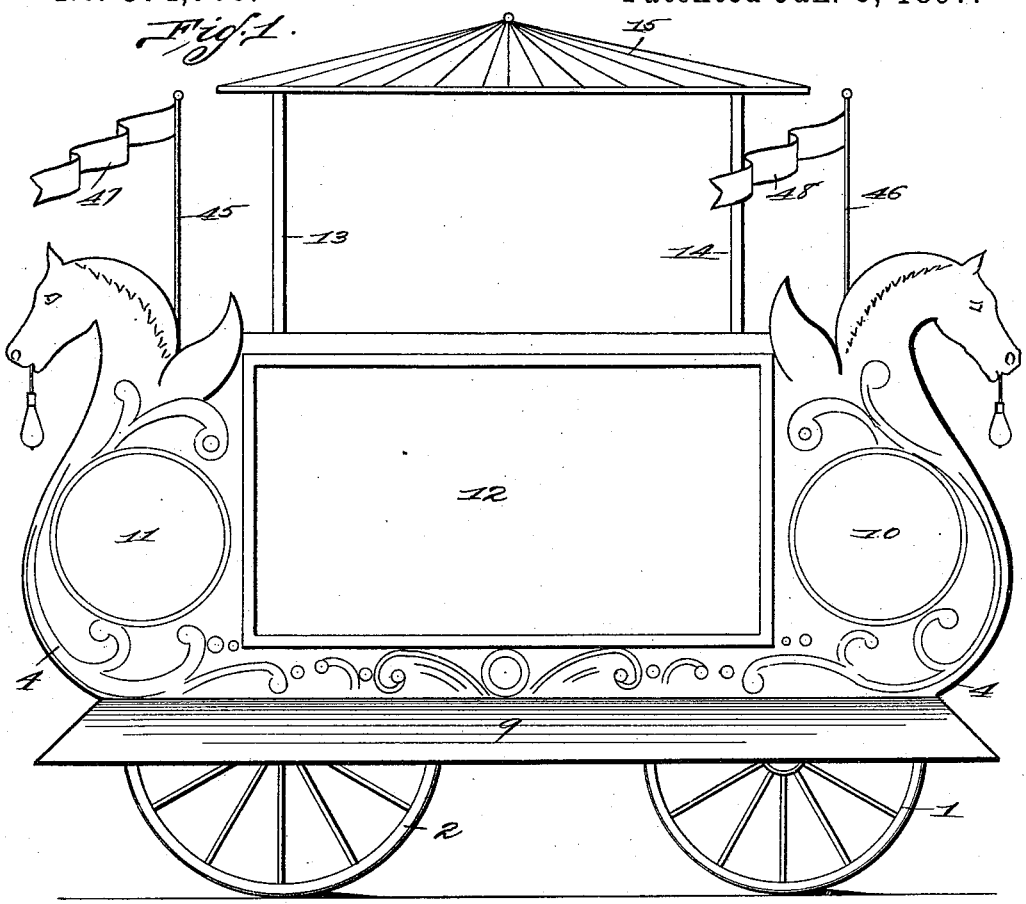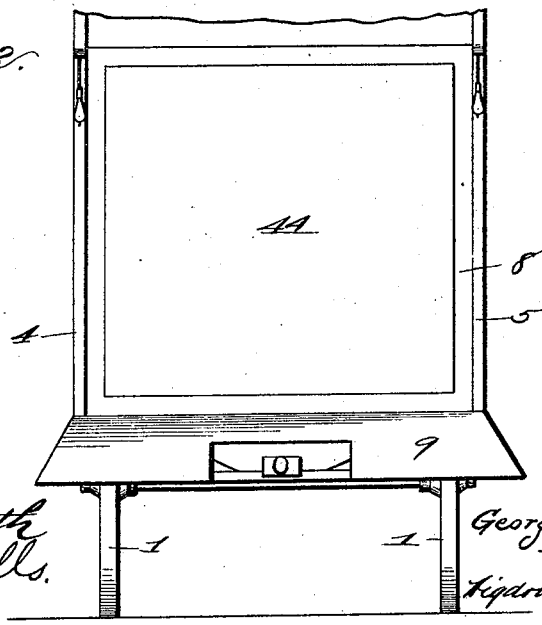

UNITED STATES PATENT OFFICE.

GEORGE A. SHARP AND ROBERT H. HOOLE, OF ST. LOUIS, MISSOURI.

ADVERTISING-WAGON.

SPECIFICATION forming part of Letters Patent No. 574,766, dated January 5, 1897.

Application filed May 18, 1896. Serial No. 592,001. (No model.)

*To all whom it may concern:*

Be it known that we, GEORGE A. SHARP and ROBERT H. HOOLE, of the city of St. Louis, State of Missouri, have invented certain new and useful Improvements in Advertising-Wagons, of which the following is a full, clear, and exact description, reference being had to the accompanying drawings, forming a part hereof.

Our invention relates to an advertising-vehicle; and it consists in the novel construction, combination, and arrangement of parts hereinafter shown, described, and claimed.

Figure 1 is a side elevation of our improved advertising-vehicle. Fig. 2 is a front elevation of the parts shown in Fig. 1 with the upper parts broken away. Fig. 3 is a transverse vertical sectional view on the line 3 3 of Fig. 1. Fig. 4 is a longitudinal sectional view of one end of the wagon, taken approximately on the line 4 4 of Fig. 3.

In the construction of our improved advertising-vehicle we make use of the front pair of wheels 1 and the rear pair of wheels 2. Extending longitudinally of the wagon and resting upon the axles of the wheels 1 and 2 is a base 3, to which is attached the side pieces 4 and 5, and said side pieces are connected at their upper edges by the top piece 6. The ends of the box thus formed are closed by the pieces 7 and 8.

Depending downwardly and outwardly from the lower edges of the pieces 4 and 5 and 7 and 8 and extending entirely around the vehicle outside of the wheels is a hood 9. The side pieces may be ornamented by any suitable configuration and have upon their outer sides and at each end the smooth surfaces 10 and 11, upon which advertising matter may be painted or printed. Between the surfaces 10 and 11 is the rectangular opening 12 in said side pieces, the object of which will appear later on.

Extending upwardly from the top piece 6 are posts 13 and 14, upon the upper end of which is mounted a canopy or cover 15.

The shaft 16 is vertically positioned in the center of the vehicle, with its lower end journaled in the base 3 and its upper end journaled in the center of the top piece 6, and upon the upper end of said shaft 16 and above said top piece 6 a disk 17 is rigidly fixed to said shaft and designed to be rotated thereby.

Mounted upon the base 3, near the lower end of the shaft 16, is a post 18, the upper end of which is bifurcated and has the horizontally-alined bearings 19 and 20, in which is rotatably mounted the shaft 21. Upon the inner end of said shaft 21 is a bevel-gear 22, meshing into the bevel-gear 23 upon the shaft 16. The outer end of the shaft 21 is squared and designed to receive a handle by which said shaft may be manually operated.

Extending transversely of the vehicle are cross-bars 24 and 25, having their ends attached to the inner faces of the side pieces 4 and 5 and at opposite ends of the openings 12.

Shafts 26, 27, 28, and 29 are mounted upon said cross-bars 24 and 25 in parallel position and extending longitudinally of the vehicle in planes opposite the openings 12.

Sprocket-wheels 30 and 31 are mounted upon the ends of the shafts 26, 27, 28, and 29, one wheel upon each shaft and in horizontal alinement with each other. A sprocket-chain 32 connects the sprocket-wheels 30, and a sprocket-chain 33 connects the sprocket-wheels 31. In horizontal alinement with the shafts 27 and 29 are mounted guide-rollers 34 and 35, and similar guide-rollers 36 and 37 are mounted below said rollers 34 and 35 and outside of the wheels and inside of the side pieces 4 and 5, and guide-rollers 38 and 39 are mounted in vertical alinement above said rollers 36 and 37 and approximately in horizontal alinement with the shafts 26 and 28. A canvas 40, upon which advertising matter is painted or printed, has one end attached to the shaft 28, and a considerable portion of said canvas is wound upon said shaft. Then the opposite end of said canvas is passed over the guide-roller 39 and downwardly under the guide-roller 36, then upwardly over the guide-roller 34, and then over the shaft 29 and is attached to said shaft. A similar canvas 41 is attached to the shaft 26, and a considerable portion of said canvas wound upon said shaft. Then the opposite end of said canvas passes over the guide-roller 38 and downwardly under the guide-roller 37, then upwardly over the guide-roller 35, thence under the shaft 27 and is attached to said shaft.

The handle 42 is positioned upon the end of either one of the shafts 26 or 28, and a similar handle 43 is mounted upon either one of the shafts 27 or 29. Upon the outer side of the end pieces 8 is the surface 44, designed to receive advertising matter.

Extending upwardly from the center of the end of the vehicle are poles 45 and 46, which carry the streamers 47 and 48, upon which streamers advertising matter may be painted or printed.

In the practical operation of our improved advertising-vehicle the canvases 40 and 41 are unwound from one set of rollers and are wound upon the other set of rollers at intervals, as required to bring the advertising matter upon said canvases into view through the openings 12 in said side pieces 4 and 5. This operation is performed by turning the handles 42 and 43.

A Punch and Judy show or other form of amusement may be mounted upon the disk 17, and said disk may be rotated by the operation of the handle upon the shaft 21.

An advertising-vehicle of our improved design and construction is very picturesque and attractive, and is consequently very effective.

We claim—

1. In a device of the class described, the base 3, the side pieces 4 and 5 attached to said base at their lower edges, the top piece 6 connecting the upper edges of said side pieces, the end pieces 7 and 8 connecting said side pieces and base and top piece, the hood 9 extending around the vehicle and attached to said base, the smooth surfaces 10 and 11 at each end of said side pieces, the rectangular openings 12 between said smooth surfaces and in said side pieces, the posts 13 and 14 extending upwardly from the top piece 6 and the canopy 15 attached to the upper ends of said posts, substantially as specified.

2. In a device of the class described, the base 3, the top piece 6, suitable connections between said base and said top piece whereby the top piece is supported, the shaft 16 vertically positioned with its lower end journaled in the center of said base and its upper end journaled in the center of the top piece 6, the disk 17 rigidly fixed in a horizontal position upon the upper end of said shaft 16, the post 18 mounted upon the base 3 and near the shaft 16, the shaft 21 mounted in a horizontal position in bearings in the upper end of said post, the bevel-gear 22 upon the inner end of said shaft 21, the bevel-gear 23 upon the shaft 16 and meshing with said bevel-gear 22, and the handle upon the outer end of said shaft 21 for manually operating the same, substantially as specified.

3. In a device of the class described, the base 3, the side pieces 4 and 5 attached to said base, the cross-bars 24 and 25 connecting said side pieces, the shafts 26, 27, 28 and 29 rotatably mounted upon said cross-bars and in positions parallel with each other and with said side pieces, the sprocket-wheels 30 and 31 mounted upon and fixed to the ends of said shafts, one wheel upon each shaft, and in horizontal alinement with each other, the sprocket-chain 32 connecting the sprocket-wheels 30, the sprocket-chain 33 connecting the sprocket-wheels 31, the guide-rollers 34 and 35 in horizontal alinement with the shafts 27 and 29 and parallel with said shafts, the guide-rollers 36 and 37 mounted below the guide-rollers 34 and 35 and in positions parallel therewith, the guide-rollers 38 and 39 mounted above the rollers 36 and 37 and approximately in horizontal alinement with the shafts 26 and 28, the canvas 40, having one of its ends attached to the shaft 28 and wound around said shaft, and its opposite end passing over the guide-roller 39 and downwardly under the guide-roller 36, then upwardly over the guide-roller 34 and attached to the shaft 29, the canvas 41 having one of its ends attached to the shaft 26 and wound around said shaft and its opposite end passing over the guide-roller 38 and downwardly under the guide-roller 37, then upwardly over the guide-roller 35 and attached to the shaft 27, and handles for operating said shafts 26, 27, 28 and 29, substantially as specified.

In testimony whereof we affix our signatures in presence of two witnesses.

GEORGE A. SHARP.
ROBERT H. HOOLE.

Witnesses:
EDWARD E. LONGAN,
S. G. WELLS.